April 19, 1955 — O. H. ARENT — 2,706,360
NON-METALLIC SPINNING LURE
Filed July 27, 1951
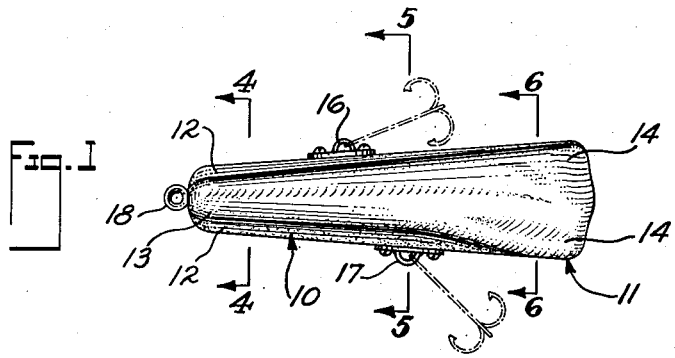
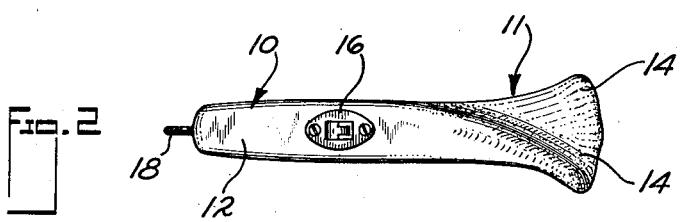
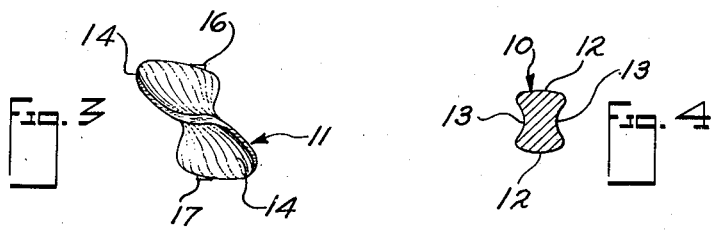 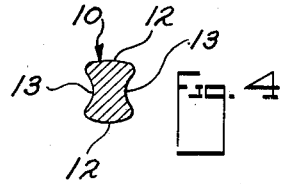
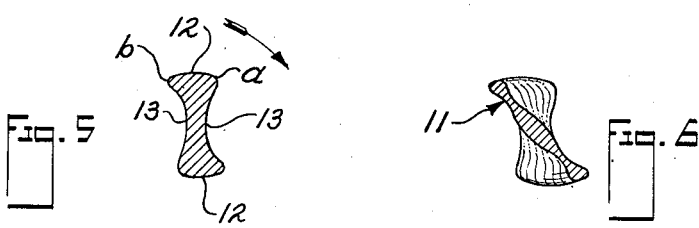 
INVENTOR.
OTTO H. ARENT
BY Richey & Watts
ATTORNEYS United States Patent Office 2,706,360
Patented Apr. 19, 1955

2,706,360

NON-METALLIC SPINNING LURE

Otto H. Arent, Hudson, Ohio

Application July 27, 1951, Serial No. 238,830

2 Claims. (Cl. 43—42.46)

This invention relates to fish lures and more particularly to fish lures for use in the art of bait casting, commonly referred to by fishermen as artificial minnows or plugs.

Artificial lures of the type mentioned are furnished by the trade in a multitude of designs and actions. The lure of the invention is of the type that might be referred to as a combined spinning and darting lure of the non-sinking type. Such lures when retrieved by an angler not only revolve at a depth determined by the speed of retrieving, but also dart from side to side, thereby attracting a strike.

The principal objects of the invention are the provision of a lure with an erratic spinning and darting action that is either slow sinking or non-sinking and can be formed by a molding process requiring no metal fins or blades. The provision of metal fins or blades complicates the assembly or manufacture of the lure as well as requiring the use of critical materials such as steel and chromium, copper or the like for corrosion-resistant plating.

The lure of the invention is essentially a one-piece body having a flute that merges with a twisted fin forming a lure that can be readily molded and yet has a spinning action. The darting action of the lure in the invention is provided by off-setting the hook mounting ears although some darting action may be present even though the ears are symmetrically mounted.

Other objects of the invention are to provide a lure that is inherently weedless and to reduce the manufacturing cost of lures of the type referred to.

The manner in which these and other objects and advantages may be attained will be apparent in the following detailed description of the preferred embodiment of my invention.

In the drawings:
Fig. 1 is a side view of the lure;
Fig. 2 is a top view thereof;
Fig. 3 is a rear view thereof; and
Figs. 4 to 6 are sections taken as indicated on Fig. 1 with the hook anchors omitted, the figures being numbered to correspond with the numbering of the respective section lines indicated in Fig. 1.

The lure is of a one-piece molded construction and has a body section 10 merging gradually with integral fin section 11. Since the lure is a spinning lure, it has no top, side or bottom but for ease of description these adjectives will be applied as the lure appears in the drawings. As seen in Fig. 1, the top and bottom of the lure are rounded as at 12. The body section is formed with opposed grooves or flutes 13 that merge gradually with spiral vanes or fins 14 that are oppositely extending and twisted, as seen in Figs. 3 and 6. Hook mounting brackets or ears 16 and 17 are mounted on the top and bottom surfaces of the lure as it appears in Fig. 1. In order to impart a darting or spinning action to the lure, these ears are offset from one another in an axial direction and as seen from Fig. 2 the hook attachments may also be offset relative to the axis of the lure body in a lateral direction. An eyelet 18 is mounted for retrieving the lure and has a shank (not shown) suitably imbedded in the lure body during the molding process. The nature of the hooks employed forms no part of the invention, it being understood that any suitable style of hook either of the weedless or the ordinary free-barbed type may be employed. Similarly, a tail hook may be added without effecting the mode of operation of the device.

As seen in Fig. 5, wherein rotation is indicated by the arrow, the leading edges (a) are rounded more than are the trailing edges (b) to reduce rotational resistance.

Any suitable moldable plastic material may be employed for making the lure such as the vinyl resins, polystyrene, urea-formaldehyde compounds, methyl methacrylate, nylon, and cellulose acetate. Pressed wood or the like may also be used. The selection of the compound may be determined by color and specific gravity requirements, the specifications of these and other suitable plastics being well known in the plastic art. If a floating lure is desired, it may be necessary to provide a void or hollow in the body, by molding, dulling, or other suitable process.

Of course, in use, since this is a spinning lure, the conventional swivel will be inserted between eye 18 and the fishing line. Upon retrieving, actual use of the lure reveals a very pronounced spinning and darting action which attracts fish and results in many strikes. I have found that if the hook anchors 16 and 17 are in axial alignment, the lure forms an excellent spinning, weedless lure having the aforesaid advantages of construction. However, I have observed, that as the axial offset of the hook is increased, a new and very effective action takes place. Not only does the lure spin as before, but now it takes on a gyratory action about the swivel. This latter action is not uniform however, but is erratic and jerky giving "wounded minnow" effect plus a pronounced "action" effect. I believe that the jerky or erratic nature of this gyratory action is caused by the sudden shift of the hooks from one side to the other as the basic gyratory action continues. In any event, the lure disclosed does produce the action referred to and has been found highly effective on fish including those of the bass family.

Due to the nature of the flutes and the spinning vanes 14, the body of the lure is itself inherently weedless and the lure can be made completely weedless for use in certain types of waters for weedless types of hooks. The smooth fairing contours and shapes of the lure elements makes it possible to mold the lure of any suitable plastic material which material may be colored before the molding process or the lure may have applied thereto any desired simulations or designs either during the molding process or after it as is known in the plastic manufacturing art.

Despite the effective darting and spinning action indicated the lure is of such a shape that no separately attached metal vanes or fins need be provided.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A fishing lure comprising an elongated buoyant member having a forward double-fluted body portion and a tail portion formed by a gradual curved extension of said body portion, and the tail portion having a twist providing oppositely extending vanes in spiral relation to each other, the lateral width of said body portion being substantially greater at the edges of said flutes than at the mid-portion of the flutes to provide for hook attachment to the edges of said body portion.

2. A combined spinning and darting fishing plug comprising a unitary elongated body member having a forward portion of generally smaller width than breadth merging gradually with a thin-section tail portion having a twist providing oppositely extending vane portions in spiral relation to each other, said body member having diametrically opposed, convexly rounded, top and bottom edges converging toward the forward end thereof; and a pair of longitudinally offset hook anchors mounted on said diametrically opposed edges, there being flutes on opposite sides of said body member extending from said forward end toward said twisted tail portion to form rounded channel portions therein, and line attaching means on said forward end, whereby said plug may be retrieved through the water with an erratic spinning and darting action.

References Cited in the file of this patent

UNITED STATES PATENTS

| Number | Name | Date |
|---|---|---|
| 261,194 | Wylly | July 18, 1882 |
| 570,687 | Stanley | Nov. 3, 1896 |
| 632,554 | Dukes | Sept. 5, 1899 |
| 1,725,636 | Heaslip | Aug. 20, 1929 |
| 1,803,777 | Speich | May 5, 1931 |
| 1,993,868 | Thornberg | Mar. 12, 1935 |
| 2,261,867 | Arbogast | Nov. 4, 1941 |
| 2,554,049 | Nacey | May 22, 1951 |
| 2,573,215 | Murphy | Oct. 30, 1951 |
| 2,583,616 | Waddell | Jan. 29, 1952 |